(12) United States Patent
Zhao et al.

(10) Patent No.: US 8,238,365 B2
(45) Date of Patent: Aug. 7, 2012

(54) METHOD AND DEVICE FOR SUPPORTING OPTICAL TRANSMISSION NETWORK SERVICE DISPATCH IN OPTICAL SYNCHRONIZATION NETWORK

(75) Inventors: Yi Zhao, Shenzhen (CN); Chu Ke, Shenzhen (CN)

(73) Assignee: ZTE Corporation (CN)

( * ) Notice: Subject to any disclaimer, the term of this patent is extended or adjusted under 35 U.S.C. 154(b) by 339 days.

(21) Appl. No.: 12/519,738

(22) PCT Filed: Dec. 26, 2006

(86) PCT No.: PCT/CN2006/003603
§ 371 (c)(1),
(2), (4) Date: Jun. 17, 2009

(87) PCT Pub. No.: WO2008/077280
PCT Pub. Date: Jul. 3, 2008

(65) Prior Publication Data
US 2010/0034217 A1   Feb. 11, 2010

(51) Int. Cl.
*H04L 29/00* (2006.01)
(52) U.S. Cl. .......... 370/466; 370/503; 370/539; 398/45; 398/66; 398/58
(58) Field of Classification Search .......... 370/252–253, 370/299, 395.54, 391, 469, 389, 539, 474, 370/386, 395.51, 466, 503; 395/45, 58, 66
See application file for complete search history.

(56) References Cited

U.S. PATENT DOCUMENTS

| | | | | |
|---|---|---|---|---|
| 5,903,372 A | * | 5/1999 | Czerwiec | 398/66 |
| 6,310,891 B1 | | 10/2001 | Dove | |
| 6,636,529 B1 | * | 10/2003 | Goodman et al. | 370/469 |
| 7,286,487 B2 | * | 10/2007 | Perkins et al. | 370/253 |
| 7,684,399 B2 | * | 3/2010 | Perkins et al. | 370/391 |
| 2003/0123493 A1 | * | 7/2003 | Takahashi | 370/539 |
| 2004/0062277 A1 | * | 4/2004 | Flavin et al. | 370/474 |
| 2004/0156325 A1 | * | 8/2004 | Perkins et al. | 370/299 |
| 2005/0078685 A1 | * | 4/2005 | MacLean et al. | 370/395.54 |
| 2005/0286521 A1 | * | 12/2005 | Chiang et al. | 370/389 |
| 2006/0098660 A1 | * | 5/2006 | Pal et al. | 370/395.51 |
| 2006/0153179 A1 | * | 7/2006 | Ho et al. | 370/386 |
| 2007/0076769 A1 | * | 4/2007 | Zou | 370/539 |
| 2007/0264015 A1 | | 11/2007 | Li et al. | |

FOREIGN PATENT DOCUMENTS

| | | |
|---|---|---|
| CN | 1791278 | 6/2006 |
| CN | 1852616 | 10/2006 |

* cited by examiner

*Primary Examiner* — Michael Thier
*Assistant Examiner* — Vincelas Louis
(74) *Attorney, Agent, or Firm* — Kolisch Hartwell, P.C.

(57) ABSTRACT

A method and device for supporting optical transmission network service dispatch in an optical synchronization network, said device comprises service cards (401, 407), backplane interface (404) and a plurality of dispatch units (405, 406), wherein, the service cards (401, 407) process the service signals and distribute them to the backplane structure frame according to the bandwith of the service signals, and connect with the corresponding dispatch units (405, 406) through the backplane structure frame, and then the dispatch units (405, 406) execute the service dispatch. Said dispatch units (405, 406) can work independently from each other, and the dispatch units can be added linearly according to the bandwidth of the signal. The present invention can compatibly implement the uniform dispatch of the ODU and SDH service on the basis of the existing optical synchronization device without changing the backplane frame structure or increasing the backplane speed.

10 Claims, 4 Drawing Sheets

METHOD AND DEVICE FOR SUPPORTING OPTICAL TRANSMISSION NETWORK SERVICE DISPATCH IN OPTICAL SYNCHRONIZATION NETWORK

TECHNICAL FIELD

The present invention relates to a service dispatch technique in the optical synchronization network, and more specifically, to a method and device for supporting the optical transport network service dispatch in the optical synchronization network.

BACKGROUND

The Optical Transport Hierarchy (OTH) is a transport hierarchy developed on the basis of optical synchronization network SDH/Sonet, and it has the advantage of large cross particle, service transparent transmission and high package efficiency. In modern society, the data service is explosively increased, and the previous optical synchronization network based on circuit switch is not suitable for transmitting such data. Although the data service can be transmitted on the framework of SDH virtual container through the multi-service transport platform, this transport hierarchy has disadvantages such as high mapping cost, low mapping efficiency and complicated technique and it cannot meet the transmission and exchange requirements of a large amount of data service.

The optical transport network re-defined a transport hierarchy which applies a new package format to package data service and the synchronous transport hierarchy (such as SDH/Sonet) service into a uniform structure, thus reducing the mapping hierarchy of the data service and guarantee the transparent transmission of the service. Packaging the optical service makes the original wave division system have the management based on optical multiplexing section layer, and thus networking is more flexible and there is space to upgrade into intelligent optical network. Compared with the present SDH/Sonet transport hierarchy, it has evident advantages and is the direction of development of the optical network.

However, a new transport hierarchy would not appear without foundation and it will not rapidly replace the existing network. It is a process of gradual development. The new transport hierarchy will coexist with the present network, develop in the present network and gradually replace the present network to play a leading role.

The G.709 specification established by ITU-T standards organization defines and regulates the OTN.

FIG. 1 shows a part of OTN mapping defined by the G.709 specification established by ITU-T standards organization, and the mapping path after OTU is not used in the present invention, so it is omitted.

The user signals are in the mapping path of the OTU (Optical Transport Unit) system shown in FIG. 1, and each user signal is input to the OPU (Optical Payload Unit) and then enter into OTU (Optical Transport Unit) through the ODU (Optical Data Unit), wherein the user signals can be SDN signals or other data signals such as STM-16, STM-64, STM-256, and so on.

As shown in FIG. 1, ITU-T G.709 defines three kinds of OPU payload structures and their corresponding speeds. Wherein:

OPU1 payload has the same speed as STM-16 has;

OPU2 payload is added with stuff columns on the basis of STM-64;

OPU3 payload is added with stuff columns on the basis of STM-256.

TABLE 1 three kinds of OPU payload structures and their corresponding speeds

| OPU type | OPU payload nominal bit rate | OPU payload bit rate tolerance |
|---|---|---|
| OPU1 | 2 488 320 kbit/s | ±20 ppm |
| OPU2 | 238/237 × 9 953 280 kbit/s | |
| OPU3 | 238/236 × 39 813 120 kbit/s | |
| OPU1-Xv | X × 2 488 320 kbit/s | ±20 ppm |
| OPU2-Xv | X × 238/237 × 9 953 280 kbit/s | |
| OPU3-Xv | X × 238/236 × 39 813 120 kbit/s | |

Notes:
The OPUk payload speeds are about: 2 488 320.000 kbit/s (OPU1 payload), 9 995 276.962 kbit/s (OPU2 payload) and 40 150 519.322 kbit/s (OPU3 payload).
The OPUk-Xv payload speeds are: X × 2 488 320.000 kbit/s (OPU1-Xv payload), X × 9 995 276.962 kbit/s (OPU2-Xv payload) and X × 40 150 519.322 kbit/s (OPU3-Xv payload)

As shown in FIG. 1, the speed of said ODU (Optical Data Unit) is obtained by adding the corresponding overhead bytes, such as cascade supervision byte TCM, management channel GCC byte, and so on, on the basis of the OPU. Therefore, the speeds of ODU should be higher than the corresponding SDH speeds, and the speeds of said ODU are shown as Table 2.

The ODU is the unit to be dispatched, and the packaging of the ODU can guarantee the completeness of its inner service, such as the completeness of the SDH service, however, the traditional SDH dispatch will lose the corresponding section overhead byte and the clock information.

TABLE 2 three kinds of ODU and their corresponding speeds

| ODU type | ODU nominal bit rate | OPU bit rate tolerance |
|---|---|---|
| OPU1 | 239/238 × 2 488 320 kbit/s | ±20 ppm |
| OPU2 | 239/237 × 9 953 280 kbit/s | |
| OPU3 | 239/236 × 39 813 120 kbit/s | |

Notes:
The ODUk bit speeds are about: 2 498 5.126 kbit/s (ODU), 10 037 273.924 kbit/s (ODU2) and 40 319 218.983 kbit/s (ODU3).

The speeds of said OTUs are shown as Table 3, wherein the corresponding management information and Forward Error Correction (FEC) are added on the basis of the ODU.

TABLE 3

3 kinds of OTU and their corresponding speeds

| OTU type | ODU nominal bit rate | OPU bit rate tolerance |
|---|---|---|
| OTU1 | 255/238 × 2 488 320 kbit/s | ±20 ppm |
| OTU2 | 255/237 × 9 953 280 kbit/s | |
| OTU3 | 255/236 × 39 813 120 kbit/s | |

Notes:
The OTUk bit speeds are about: 2 666 057.143 kbit/s (OTU1), 10 709 225.316 kbit/s (OTU2) and 43 018 413.599 kbit/s (OTU3).

The frame period of said OTUs are shown in Table 4, different from the constant frame period of SDH, the frame period of the OTU changes with levels.

TABLE 4 the frame period of the OTU

| OTU/ODU/OPU type | Period |
|---|---|
| OTU1/ODU1/OPU1/OPU1-Xv | 48.971 us |
| OTU2/ODU2/OPU2/OPU2-Xv | 12.191 us |
| OTU3/ODU3/OPU3/OPU3-Xv | 3.035 us |

Notes:
The approximation precision of the period reaches to 3 digits after decimal point.

Since OTU/ODU/OPU are different parts in the same frame structure, their frame periods are the same.

For the dispatch of the OTU in the optical synchronous transport system, there are several methods in the industry:

Method 1: according to the specification of OIF (Optical Internetworking Forum) organization, the OTU service can be transmitted in the TFI-5 backplane frame format. TFI-5 defines two speeds: 2.5 Gbit/s and 3.11 Gbit/s, corresponding to STM-16 and STM-20, respectively. For ODU1 with the speed being higher than STM-16, C-4-17C cascaded method is applied to transport and pointer value 522 is regenerated. When asynchronously mapping the ODU service to C-4 container, a mechanism similar to justification needs to be applied: the payload data of the ODU are divided into several data blocks, and each data block is re-assembled to be a structure having justification discrimination bit and justification opportunity bit, and the majority justification using the justification discrimination bit determines whether the justification opportunity bit transports data or not.

Method 2: increase the 2.5 Gbit/s backplane transport speed to 17/16×2.5 Gbit/s, directly apply STM-17 to transport the user signals of ODU1, or apply the method of dividing the STM-68 into several STM-17s to transport the ODU2 signals, or apply the method of dividing the STM-272 into several STM-17s to transport the ODU3 signals.

However, the above two methods have their disadvantages:

(1) Method 1 applies the constant pointer instead of the pointer value to transport, which requires that the position of the header of the ODU frame is also constant in STM-17, thus requiring relatively large buffer memory. Meanwhile, for a speed greater than 2.5 Gbit/s, only the speed of 3.11 Gbit/s can be used to transport, which wastes a lot of bandwidth, has more strict requirements for the components and relatively fewer supportive chips.

(2) Although Method 2 uses the pointer value to avoid large buffer memory, it also changes the general backplane routing speed, which makes the backplane speed a little higher than 2.5 Gbit/s and it can not compatible with the existing systems, moreover, the non-standardized speed lacks the support of well-developed chips, so their application is not flexible.

Therefore, how to uniformly dispatch ODU and SDH service without modifying the framework of the existing devices and without increasing the backplane routing speed is a problem should be solved.

SUMMARY OF THE INVENTION

The present invention offers a method and device for supporting optical transport network service dispatch in the optical synchronization network to implement the uniform dispatch of ODU and SDH service to avoid modifying the framework of the existing device or increasing the backplane routing speed.

The present invention offers a device for supporting optical transport network service dispatch in the optical synchronization network, including service cards, backplane interface and a plurality of dispatch units, wherein:

The service cards are used to process and distribute the service signals, and they include the service signal processing module to process the service signals and the service signal distribution unit to distribute the service signals to different backplane routings of the backplane interface;

The backplane interface is used to receive the service signals distributed by the service cards through the backplane routing, and send the service signals to the dispatch units;

The dispatch units connect with each service card through the backplane interface to dispatch the service signals.

Furthermore, said service cards are common service cards or optical transport network service cards.

Furthermore, the service signals received by said service cards are interface signals of the SDH, the interface signals of the PDH, the interface signals of the optical transport hierarchy, the interface signals of the high-speed Ethernet, or the interface signals of the Gbit Ethernet; said service signal distribution unit applies different distribution methods, including but not limited to the method of bit segmentation, according to different service signals.

Furthermore, the signal distribution function of said service signal distribution unit includes:

Distributing the service signals to different backplane routings, and then sending the service signals to the corresponding dispatch units to be dispatched;

Mapping the service signals to the standard backplane frame format, and applying the mechanism of pointer justification to indicate the position of the service signals corresponding to the backplane frame structure;

Or dividing the service signals into data blocks with constant length, and mapping the user signals to the virtual container with the method of bit speed justification;

Or distributing the service signals to several service dispatch units to be dispatched;

Or distributing the service signals to a different number of dispatch units according to different service cards.

Furthermore, said backplane interface has the TFI-5 backplane routing.

The present invention also offers a method for supporting optical transport network service dispatch in the optical synchronization network, which uses the service cards and the dispatch units to dispatch the optical transport service and comprises the following steps:

(1) The service cards receive the service signals, extract the overhead and implement the corresponding supervision and management;

(2) The service cards remap the service signals to the backplane frame structure, and distribute the service signals to the corresponding number of backplane signal frames according to the bandwidth of the service signals;

(3) The service cards connect with several dispatch units through the backplane signal frame;

(4) After the connection is established, all dispatch units work synchronously while independently perform their own dispatch function;

(5) The dispatch units send the dispatched service signals to their corresponding service cards through the backplane, and output reversely the service signals.

Furthermore, said backplane signal frame in step (2) has the structure of TFI-5 format, and the service signals are distributed according to the bandwidth of said service signals and the size of the TFI-5 backplane signal frame and re-mapped to the backplane frame structure.

Furthermore, said backplane signal frames in step (3) correspond with the dispatch units, one-to-one or several-to-one.

Furthermore, said service signals in step (1) are interface signals of the SDH, the interface signals of the PDH, the interface signals of the optical transport hierarchy, the interface signals of the high-speed Ethernet or the interface signals of the Gbit Ethernet; According to different service signals, said service cards apply different distribution methods, including but not limited to bit segmentation.

Furthermore, step (5) can be further divided into the following steps:

The dispatch units connect with the service cards through the backplane signal;

Each dispatch unit outputs the dispatched service to the service distribution unit of each card;

A service processing module extracts the overhead from the frame, recovers the complete service signals and sends them out.

On the basis of the existing optical synchronous device, the present invention upgrades and supports the dispatch of the OTN service through the method of adding the dispatch units, compatibly implements the uniform dispatch of ODU and SDH service, and directly supports the higher-speed user service, and meanwhile, guarantee that the dispatch of the original optical synchronization service will not be affected, thus more economic and convenient than changing the communication bandwidth of the backplane, changing the backplane frame structure or increasing the backplane speed, and compared with those methods, it is easier to be implemented and the cost is lower.

PREFERRED EMBODIMENTS OF THE PRESENT INVENTION

The present invention relates to a dispatch technique of the optical synchronization network, and more especially, to a dispatch technique compatible with OTN transport hierarchy. According to the service dispatch problem in the optical transport network, the present invention offers a new dispatch idea which can uniformly dispatch the ODU and SDH services by adding the dispatch module without modifying the framework of the existing devices or increasing the backplane routing speed. The key is mapping reversely the ODU to the SDH container, and adding cross board to cross the redundant speed of the ODU.

Under the dispatch mode of the present invention, the service signals are mapped to the backplane frame structure with a fixed format, for example, in TFI-5 format, the pointer of the TFI-5 can be used to indicate the position, to avoid large capacity of storage, thus to adjust the ODU frame header to align with the TFI-5 frame header, and also the overhead information in the TFI-5 frame structure can be fully used to perform management and supervision.

In order to implement the service dispatch method of the present invention, the hardware implementation is mainly based on two components: the service cards and the dispatch units.

1. The Service Cards

They are mainly used to process the service signals, distribute the service signals to different backplane routings and send the service signals to the corresponding dispatch units through the backplane routing to be dispatched.

Figure 3:
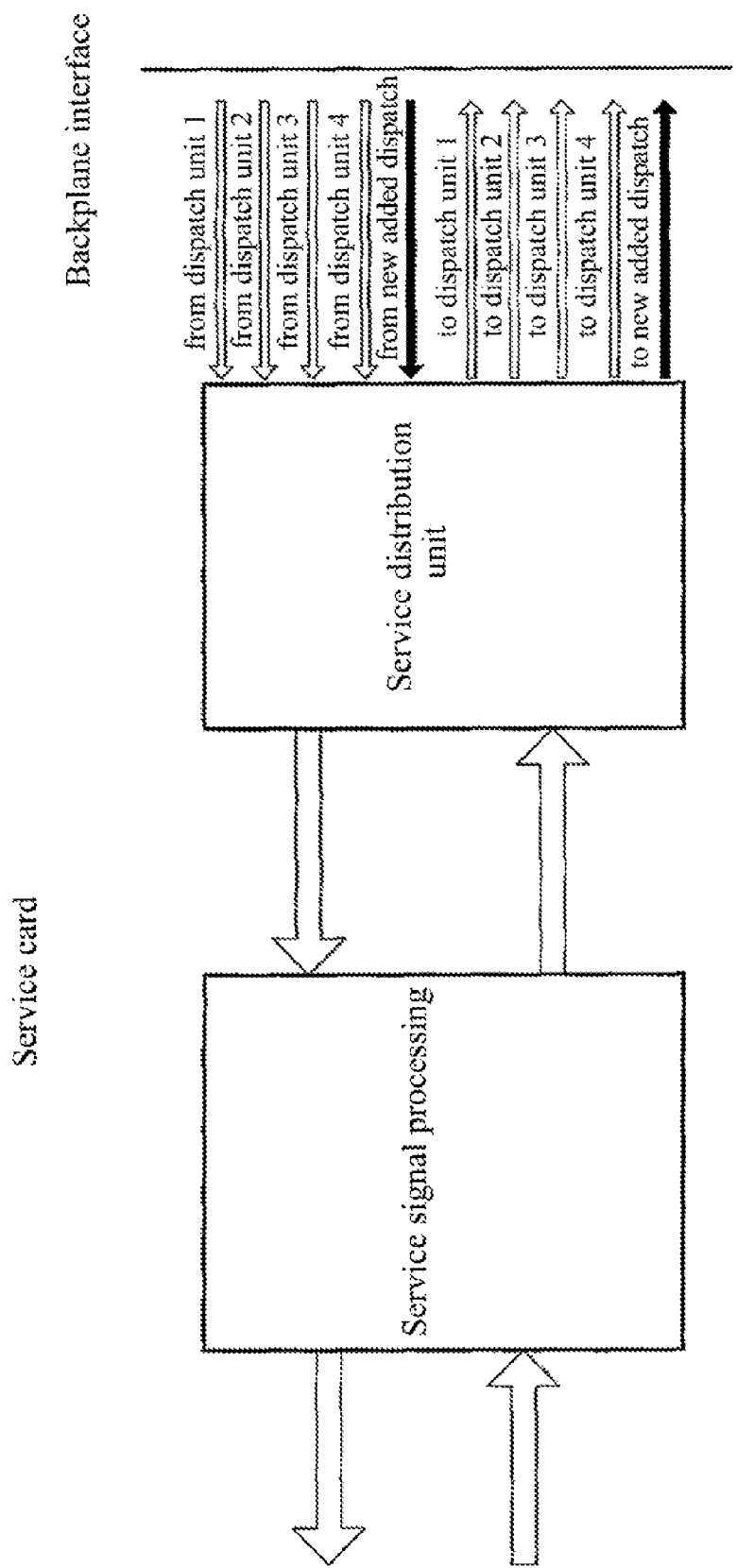
FIG. 3 is an illustration of a single common service card.

FIG. 3 shows the functional diagram of a single common service card, which mainly comprises two parts:

(1) a service signal processing module, which processes the service signals on the service cards. Said service signals can comprise the interface signals of SDH/SONET, PDH and OTH, and other interface signals of FE, GE, FICON, ESCON, and so on.

(2) a service signal distribution unit, which performs the distribution function of the service signals on the service cards, distributes the service signals to different backplane routings, and then sends them to the corresponding dispatch units to be dispatched.

Said signal distribution function also comprises mapping the service signals to a format of the standard backplane frame, such as TFI-5, and applying the pointer justification mechanism to indicate the position of the service signals corresponding to the backplane frame structure;

Said signal distribution function also comprises dividing the service signals into data blocks with constant length, and mapping the user signals to the virtual container with the method of bit speed justification;

Said signal distribution function also comprises distributing the service signals to several service dispatch units to be dispatched;

According to different service cards, the signal distribution function has the capability of distributing the service signals to a different number of dispatch units, for example, for the common service cards and OTN service cards, their service signals can be distributed to a different number of dispatch units.

Said service signal distribution unit applies different distribution methods according to different service signals. For example, for 10GEWAN or STM-64 interface signals, the signals can be distributed to 4 different TFI-5 backplane routings; while for ODU2 signals, they can be distributed to 5 different TFI-5 backplane routings. The distribution methods include but not limited to bit segmentation, and different service signals should apply different segmentation methods.

The traditional bit segmentation averagely distributes the different bits of one byte of a service signal to different dispatch units, for example, for the 8 bits of a byte, the first and second bits are sent to the first dispatch unit, the second and third bits are sent to the second dispatch unit, and in the same way, the four dispatch units simultaneously dispatch to implement the dispatch of a whole byte. When the service needs 5 dispatch units, the amount of service distributed to the fifth dispatch unit will be less than that distributed to other dispatch units, and it can be implemented through re-copying or re-reading data.

Figure 1:
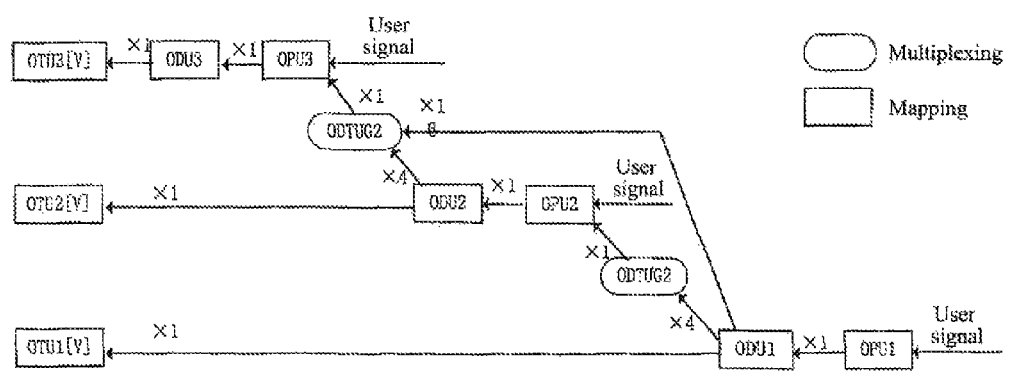
FIG. 1 is a structural diagram of OTN mapping.
Figure 2:
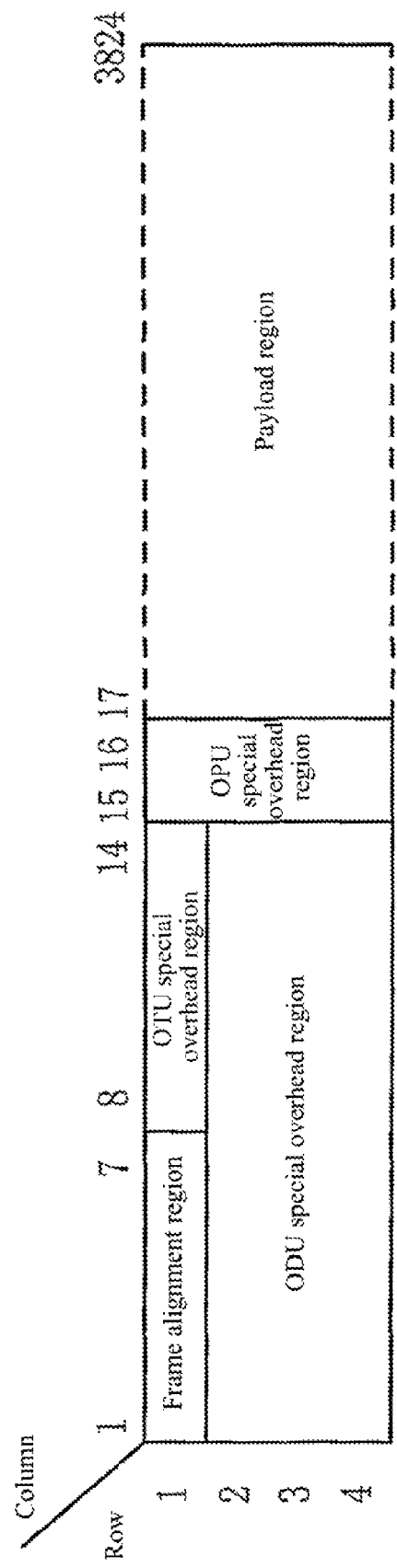
FIG. 2 is a structural diagram of the OTN frame.

FIG. 2 is a structural diagram of the OTU frame, a 4*3824 frame structure mainly comprising the frame alignment region, OTU overhead region, ODU overhead region, OPU overhead region and payload region.

The number of signals from the service signal distribution unit to the backplane can be adjusted according to the bandwidth of the user signals. For example, for the STM-256 signal with the speed being 39 813 120 kbit/s, its corresponding ODU3 speed is 43 018 413.559 kbit/s, if the bandwidth of the corresponding service card of each dispatch unit is STM-64 (4 TFI-5 bandwidths), which is about 9 953 280 kbit/s, 4 dispatch units cannot implement the dispatch of ODU3, it needs to add an extra dispatch unit to perform the dispatch of the redundant service.

2. The Dispatch Units

Said dispatch units are mainly used to perform the dispatch of service signals, they connect with all service cards. During the connecting, a standard signal format is applied and they connect with each service card through the backplane. The applied signal format can be TFI-5 or other signal formats, for example the self-defined frame format.

All dispatch units can independently perform service dispatch, but have the function of performing service signal dispatch once synchronously.

Based on the above service cards and the dispatch units, the method of implementing the OTN service dispatch in accordance with the present invention mainly comprises the following steps:

(1) The service cards receive the service signals, extract the overhead of the service signals in the service signal processing module, and perform the corresponding supervision and management according to the extracted overhead;

(2) The service signal distribution unit of the service cards remaps the service signals to the backplane frame structure, and distributes the service signals to a different number of backplane signal frames according to the bandwidth of the service signals;

For example, the STM-16 service signals can be mapped to one TFI-5 backplane frame structure, while the ODU1 service signals can be mapped to two TFI-5 backplane frame structures;

(3) The service cards connect with several dispatch units through the backplane signals;

Said backplane signal frames do not correspond with the dispatch units one-to-one. Depending on the capacity of the designed dispatch units, if the capacity is relatively large, it can correspond to several signal frames, otherwise, although the desired extra dispatch units are the same as those other dispatch units, they only need to process the redundant speed of the service cards, that is, the amount of data they process maybe less than that processed by other dispatch units.

(4) After the connection is established, all dispatch units work synchronously while independently to implement their dispatch function;

(5) The dispatch units send the dispatched service signals to the corresponding service cards through the backplane and output reversely the service signals.

After the service cards repackage the new service signals according to the data output by the dispatch units, the whole dispatch process is terminated. And the reverse output process in step (5) comprises:

The dispatch units connect with the service cards through the backplane signals;

Each dispatch unit outputs the dispatched service to the service distribution unit of each card;

The service signal processing module extracts overhead from the frame, recovers the complete service signals and sends them out, until now, the dispatch is completed.

If the dispatch is to be cancelled, a network management or a signaling is needed to notify the dispatch cancellation.

Figure 4:
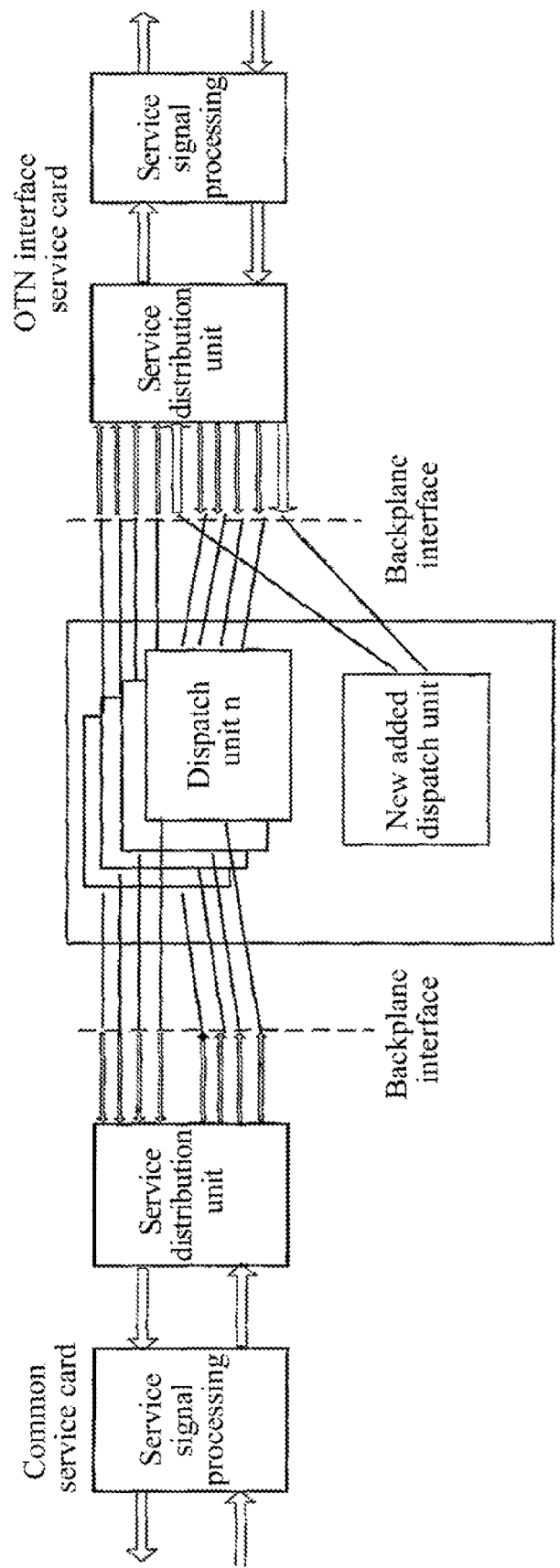
FIG. 4 is an illustration of the system, which connects the common service cards with the OTN interface service cards, performing dispatch after adding the dispatch units.

FIG. 4 illustrates that the common service cards, OTN interface service cards and the dispatch units work together. OTN interface service cards and the common service cards connect with several dispatch units through the backplane, respectively. The common service card needs only 4 dispatch units, while the OTN interface service card needs an extra dispatch unit besides the four dispatch units to implement OTN service dispatch.

When adding new OTN interface service cards in the existing optical synchronization network, after the OTN service cards are inserted into the system, OTN service signals occupy more backplane signals compared with the typical service signals, with the dispatch method of the present invention, the redundant signals can be dispatched by adding new dispatch units without changing the existing framework.

When distributing the signals on the backplane, the present invention distributes the signals according to the signal bandwidth, for the signals with different bandwidths, a different number of backplane signals are distributed, which will correspond to a different number of dispatch units, and on the basis of the original dispatch units, the redundant bandwidth of the OTN service signals can be dispatched by adding new dispatch units.

The method of the present invention has the following characteristics:

(1) Different service signal bandwidths correspond to a different number of dispatch units;

(2) The number of the dispatch units can be linearly increased to support the user signals with different bandwidths;

(3) The uniform dispatch of ODU and SDH service can be compatibly implemented;

(4) The pointer of the backplane TFI-5 can be used to indicate the position to avoid large capacity storage.

When the bandwidth from the service cards to the backplane is wide enough (that is, the service bandwidth is not greater than the physical bandwidth from the cards to the backplane), it is very easy to increase the service bandwidth to the backplane through the service signal distribution unit, and thus the part of ODU speed which is higher than that of SDH has channels to be connected to the corresponding dispatch units. Wherein, the hardware should have enough bandwidth to implement the method of increasing the number of dispatch units.

When the service dispatch units can independently work and the number of the service dispatch units can be linearly increased, adding dispatch units can support the user service bandwidth with higher speed. The speed supported by each service card depends on the bandwidth from the service cards to the dispatch units, and in turn, increasing the number of dispatch units will increase the bandwidth from the service cards to the dispatch units, so as to support wider bandwidth of the user service.

On the basis of the optical synchronous device, the present invention upgrades and supports the OTN service dispatch through adding the dispatch capacity, which can directly support higher-speed user services and meanwhile keep the dispatch of the original optical synchronous service from being affected. Moreover, adding the dispatch capacity is much more economic and convenient than changing the backplane communication bandwidth, changing the backplane frame structure or increasing the backplane speed, thus easier to be implemented and has lower cost.

INDUSTRIAL APPLICABILITY

On the basis of the existing optical synchronous device, the present invention upgrades and supports the OTN service dispatch through the method of adding the dispatch units, compatibly implements the uniform dispatch of ODU and SDH service, and directly supports the higher-speed user service, and meanwhile, guarantees that the dispatch of the original optical synchronous service will not be affected. Thus, the method of the present invention is more economic and convenient than changing the communication bandwidth of the backplane, changing the frame structure of backplane or increasing the backplane speed, and compared with these methods, it is easier to be implemented and the cost is lower.

What we claim is:

1. A device for supporting optical transport network service dispatch in an optical synchronization network, comprising service cards, a backplane interface and a plurality of dispatch units, wherein:

the service cards are used to process and distribute service signals, and each service card includes a service signal processing module to process the service signals and a service signal distribution unit to distribute the service signals to different backplane routings of the backplane interface, wherein the service signal distribution unit is configured to adjust a number of the service signals from the service signal distribution unit to the backplane interface according to different bandwidths of the service signals;

the backplane interface is used to receive the service signals distributed by the service cards through the backplane routings, and send the service signals to the dispatch units;

the dispatch units are connected with each service card through the backplane interface to dispatch the service signals, wherein the number of the dispatch units connected with the service cards can be linearly increased according to the different bandwidths of the service signals and the increased number of the dispatch units connected with the service cards is relevant to the maximum bandwidths of the service cards.

2. The device of claim 1, wherein said service cards are common service cards or optical transport network service cards.

3. The device of claim 1, wherein the service signals received by said service cards are interface signals of an SDH, or interface signals of a PDH, or interface signals of an optical transport hierarchy, or interface signals of a high-speed Ethernet or interface signals of the Gbit Ethernet; said service signal distribution unit applies different distribution methods, including but not limited to a method of bit segmentation, according to different service signals.

4. The device of claim 1, wherein signal distribution function of said service signal distribution unit includes:

distributing the service signals to different backplane routings, and then sending the service signals to corresponding dispatch units to be dispatched; or mapping the service signals to a standard backplane frame format, and applying a mechanism of pointer justification to indicate the position of the service signals corresponding to a backplane frame structure;

or dividing the service signals into data blocks with a constant length, and mapping user signals to a virtual container with a method of bit speed justification; or distributing the service signals to a plurality of service dispatch units to be dispatched;

or distributing the service signals to a different number of dispatch units according to different service cards.

5. The device of claim 1, wherein said backplane interface has a TFI-5 backplane routing.

6. A method for supporting optical transport network service dispatch in an optical synchronization network, which uses service cards and dispatch units to dispatch an optical transport service, wherein the method comprises the following steps:

(1) the service cards receiving service signals, extracting an overhead and implementing corresponding supervision and management;

(2) the service cards remapping the service signals to a backplane frame structure, and distributing the service signals to different numbers of backplane signal frames according to different bandwidths of the service signals;

(3) the service cards connecting with several dispatch units through a backplane signal frame, wherein the number of the dispatch units connected with the service cards can be linearly increased according to the different bandwidths of the service signals and the increased number of the dispatch units connected with the service cards is relevant to the maximum bandwidths of the service cards;

(4) after the connection is established, all dispatch units working synchronously while independently performing their own dispatch functions;

(5) the dispatch units sending the dispatched service signals to corresponding service cards through a backplane, and outputting reversely the service signals.

7. The method of claim 6, wherein said backplane signal frame in step (2) has a structure of TFI-5 format, and the service signals are distributed according to the bandwidth of said service signals and a size of a TFI-5 backplane signal frame and re-mapped to the backplane frame structure.

8. The method of claim 6, wherein said backplane signal frames in step (3) correspond with the dispatch units one-to-one or several-to-one.

9. The method of claim 6, wherein said service signals in step (1) are interface signals of an SDH, or interface signals of a PDH, or interface signals of an optical transport hierarchy, or interface signals of a high-speed Ethernet or the interface signals of a Gbit Ethernet; according to different service signals, said service cards apply different distribution methods, including but not limited to bit segmentation.

10. The method of claim 6, wherein the step (5) can be further divided into the following steps:

the dispatch units connecting with the service cards through backplane signals;

each dispatch unit outputting a dispatched service to a service distribution unit of each card;

a service processing module extracting an overhead from a frame, recovering complete service signals and sending the complete service signals out.

* * * * *